Feb. 15, 1944.    J. D. WALKER    2,342,024
METHOD OF TREATING SEWAGE AND APPARATUS THEREFOR
Filed Feb. 5, 1940    3 Sheets-Sheet 1
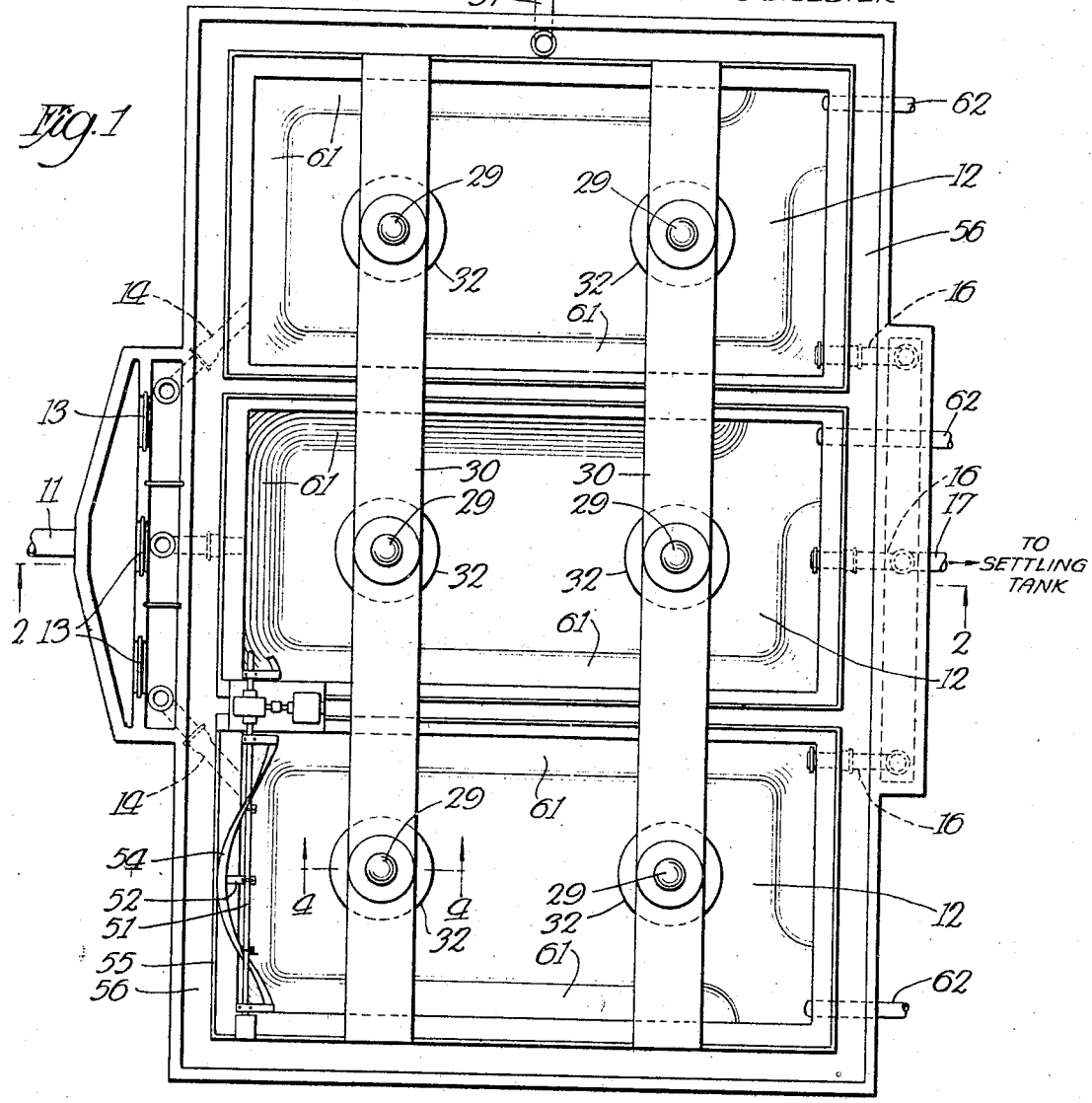
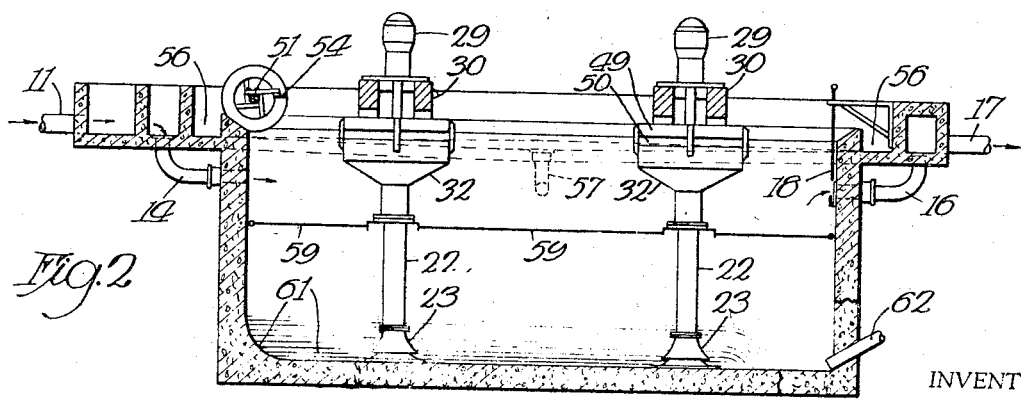
INVENTOR.
James D. Walker
BY Mann, Brown & Cox
ATTORNEYS.

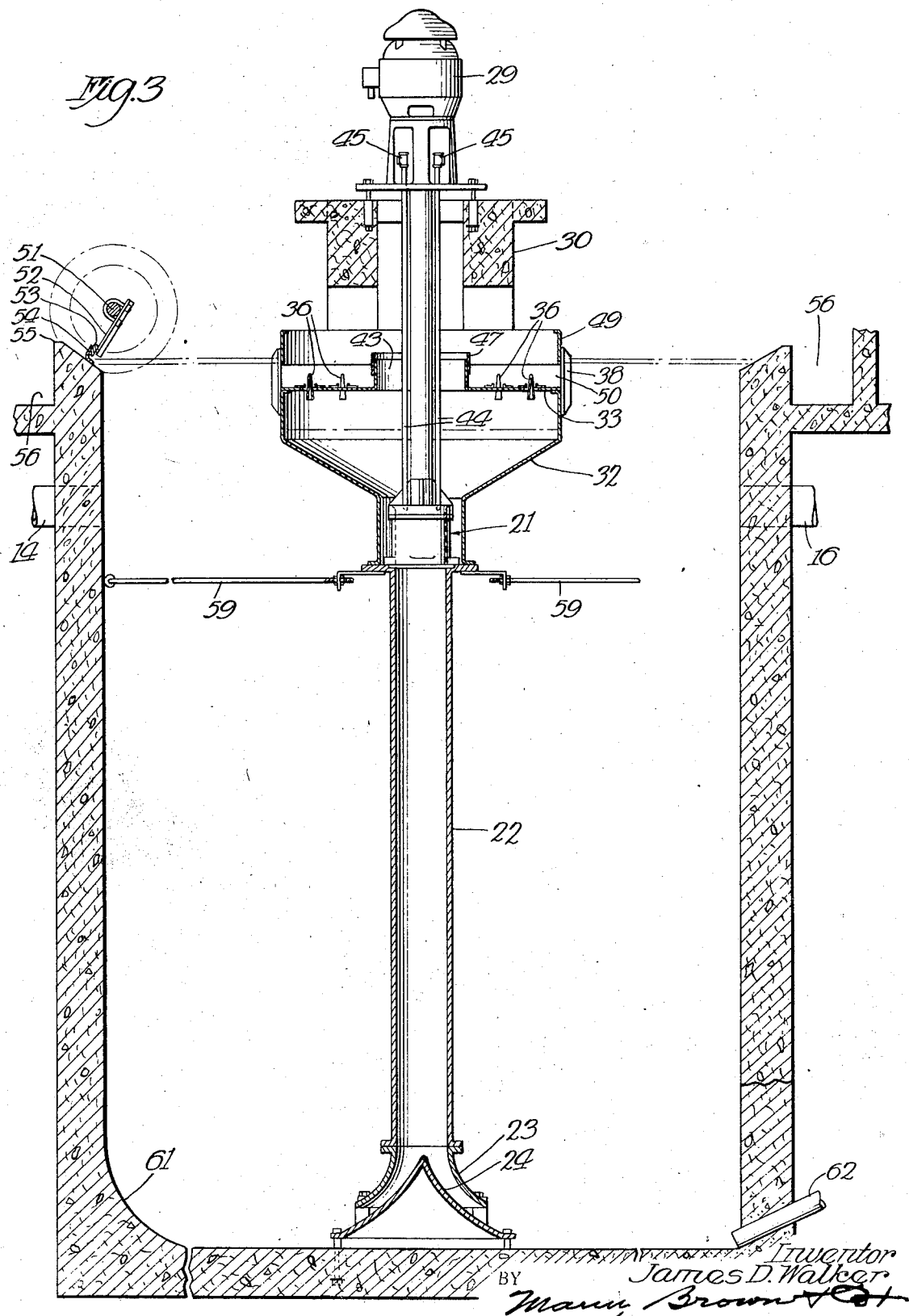

Feb. 15, 1944.   J. D. WALKER   2,342,024
METHOD OF TREATING SEWAGE AND APPARATUS THEREFOR
Filed Feb. 5, 1940   3 Sheets-Sheet 3
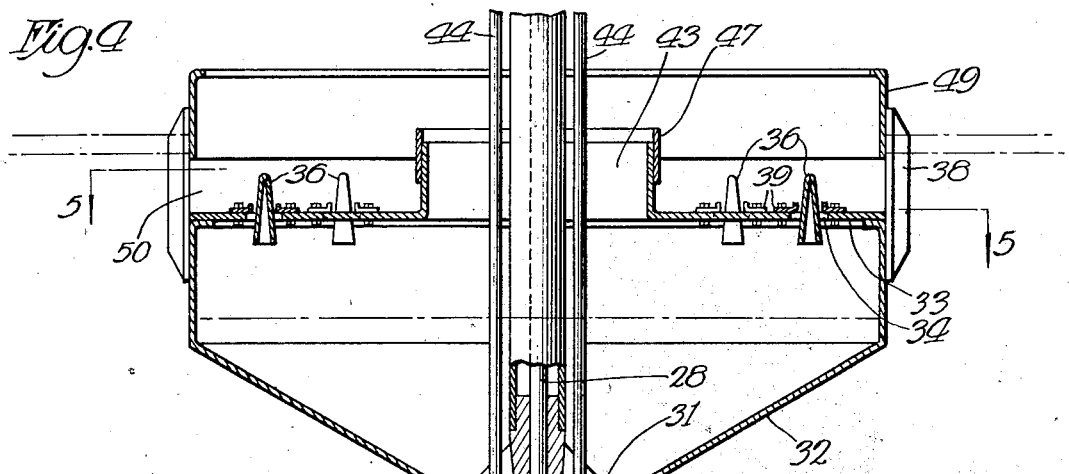
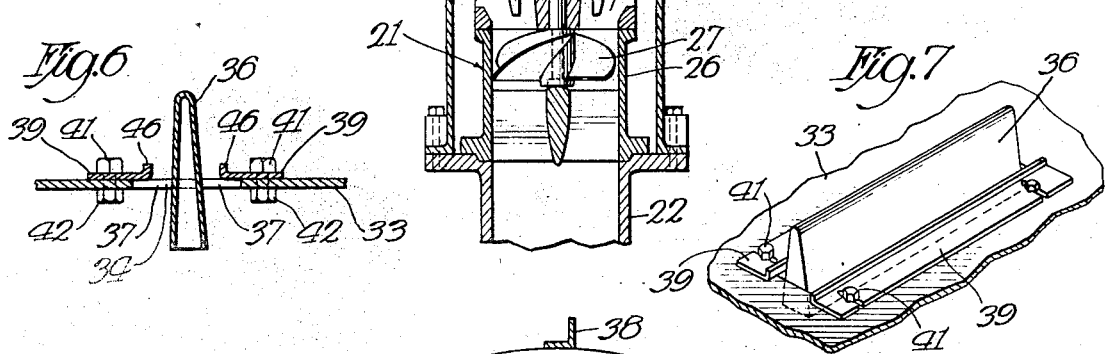
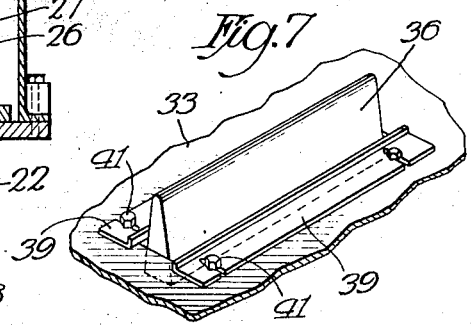
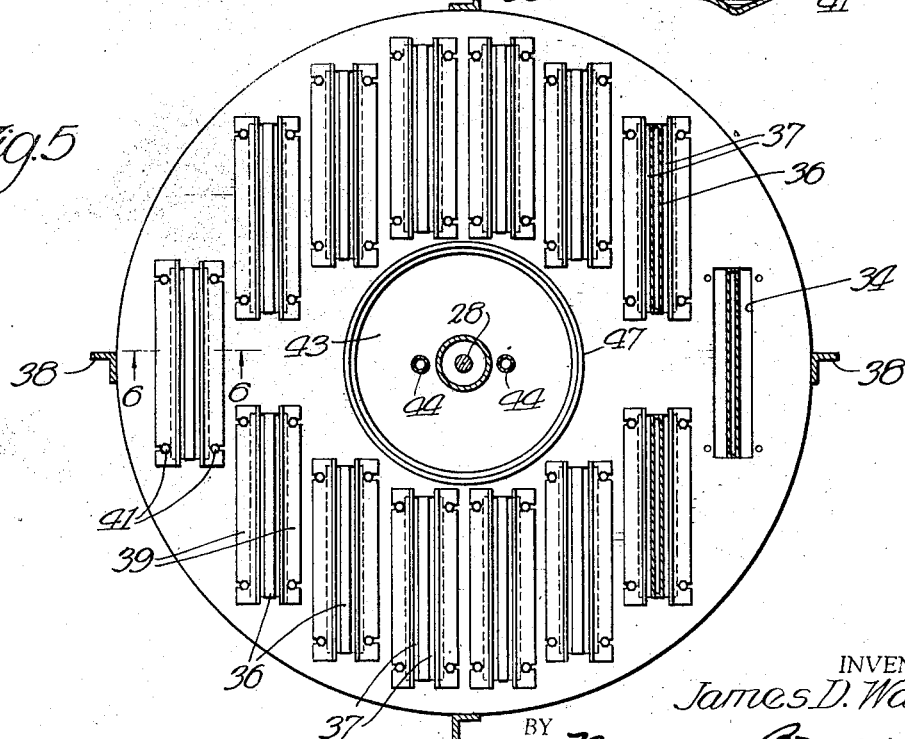
INVENTOR.
James D. Walker
BY
ATTORNEYS.

Patented Feb. 15, 1944

2,342,024

UNITED STATES PATENT OFFICE 2,342,024

METHOD OF TREATING SEWAGE AND APPARATUS THEREFOR

James D. Walker, Aurora, Ill., assignor to The American Well Works, Aurora, Ill., a corporation of Illinois Application February 5, 1940, Serial No. 317,371

10 Claims. (Cl. 210—53)

The treatment of sewage is sometimes greatly handicapped by the presence of large quantities of grease in the sewage. The efficiency of conventional sewage treatment methods, such as the activated sludge method, is greatly impaired by the presence of grease. Although various methods have been proposed for the removal of the grease, none of them before the present invention has been entirely satisfactory from the standpoints of effectiveness and economy. According to the present invention, grease is very effectively eliminated by a particular method of flotation. This treatment is extremely economical, partly because the necessary equipment is relatively inexpensive and partly because it simultaneously accomplishes three other desirable results, namely pre-aeration and flocculation of the sewage and grit removal. Pre-aeration and flocculation of the sewage are both very desirable in themselves and, even aside from grease removal, a large part of the cost of the treatment here contemplated may be saved in subsequent steps in the sewage treatment. Pre-aeration, flocculation and grit removal are so important that they have been accomplished heretofore even at the expense of separate units therefor. Now they are accomplished by a single unit and grease is removed at the same time.

The treatment of the present invention precedes the primary settling of the sewage. The efficient flocculation accomplished results in much more effective settling than would otherwise be possible. In fact, the proportion of solid matter settled in the primary settling tank is increased from about 25% to 50%. This, together with the pre-aeration, is very valuable whether or not there is further treatment of the sewage. If the sewage is to be treated by the activated sludge process, the pre-aeration supplies the immediate oxygen demand so that the aerobic bacteria will immediately have available the oxygen which is necessary for them to perform their function. If the effluent from the primary settling tank is allowed to flow into a body of water, such as a stream or lake, the pre-aeration, in supplying the immediate oxygen demand, not only hastens the natural purification of the sewage but also prevents the killing of fish by the sudden removal of oxygen from the water in which they are swimming. Sewage which has not been pre-aerated and which has a high immediate oxygen demand will remove the dissolved oxygen from the water with which it comes in contact, and a fairly large portion of a stream or pond may thus be rendered incapable of sustaining animal life.

According to the preferred form of the present invention, a circulating pump is provided which draws the liquid into the pump a short distance below the surface of the liquid and expels it at the bottom of the tank after mixing it with minute bubbles of air. The minute bubbles of air drift upwardly quite slowly in relatively quiescent portions of the tank and float the grease to the surface with them. They are too small to create a surface disturbance which would cause a return of the grease to the body of the liquid, as do bubbles which liberate themselves from diffusion plates. At the same time the grit stays near the bottom of the tank and is washed free of organic matter by relatively swift currents along the tank floor. The grease-free sewage is drawn off at a level between the grease and the grit, and the grease is skimmed from the top of the tank.

Additional objects and advantages of the invention will be apparent from the following description and from the drawings, in which:

Fig. 1 is a plan view of a three-tank grease removal unit chosen for illustration of this invention.

Fig. 2 is a vertical sectional view taken approximately on the line 2—2 of Fig. 1, with the bottom right-hand corner broken away.

Fig. 3 is a fragmentary view similar to Fig. 2 but showing the main features of the invention on a larger scale.

Fig. 4 is a vertical cross sectional view of the upper portion of the recirculation unit on a larger scale, being taken approximately on the line 4-4 of Fig. 1.

Fig. 5 is a horizontal cross sectional view taken approximately on the line 5—5 of Fig. 4, showing a plan view of the injector plate with some parts removed or shown in cross section for the sake of clarity.

Fig. 6 is a fragmentary cross sectional view taken approximately on the line 6—6 of Fig. 5.

Fig. 7 is a perspective view of one of the flow control units shown in Figs. 5 and 6.

A preferred form of the invention has been chosen for illustration and description, in compliance with section 4888 of the Revised Statutes, but persons skilled in the art will readily perceive other means for accomplishing the same results.

As seen in Fig. 1, raw sewage will enter the grease removal unit through a pipe 11 and will be directed to one or more of the tanks 12 by flow control gates 13, the sewage entering any tank 12 through a pipe 14. After treatment, the sewage flows through an outlet pipe 16 to a connecting pipe 17 from which it flows into the next unit of the filtration plant, said next unit ordinarily being a settling tank. The level of the liquids both in the settling tank and in the tanks 12 can be controlled by conventional drawing-off weirs in the settling tank which permit effluent to flow from the settling tank when the liquid level gets above said weirs and consequently from any tank 12 into the settling tank. A shear gate 18 would be provided for each tank 12 to close the outlet pipe 16 from the tank, either for the purpose of emptying the tank or for causing it to overflow.

Recirculation apparatus

The recirculation apparatus, seen best in Figs. 3 and 4, is preferably of the axial flow pump type provided with aerating features similar to those described in my prior Patent No. 2,082,759, or in my copending application Serial No. 265,646, or a combination of both types of aerating means. As seen in Fig. 3, the recirculating apparatus includes a pump unit 21, a downflow tube 22 having a nozzle 23 cooperating with a spreader 24 to cause the liquid to flow out along the floor of the tank at relatively high speed. The pump unit 21 includes a pump housing 26 and an impeller 27. The impeller 27 is driven by a shaft 28 which in turn is driven by a motor 29 carried by a bridge 30 extending across the tank 12. The cap of the housing 26 is provided with intake openings 31 which open into a launder 32. The top of the launder 32 is partially closed by a partition or injector plate 33 which is provided with a plurality of rectangular openings 34. In each of these openings there is preferably provided a flow divider 36, seen in perspective in Fig. 7. These flow dividers may be bent from sheet metal and may be welded at their ends to the plate 33 forming passages 37, each of which extends all along one side of the divider 36. The sewage flows onto the top of the injector plate 33 between the support brackets 38, and its flow through the injector plate 33 may be regulated by control plates 39 which are adjustably secured by bolts 41 screwing into nuts 42, preferably welded on the bottom of the plate 33.

The pumping speed of the impeller 27 is preferably such as to draw the liquid in the launder 32 down several inches below the injector plate 33 or even approximately to the top of the conical portion of the launder 32. The impeller is preferably so designed that the liquid level in the launder 32 will be fairly constant, this being made possible by increased effectiveness of the impeller 27 if the liquid level thereabove in the launder 32 should rise slightly. Air can enter the space between the liquid level and the plate 33 freely through the throat 43. It is apparent that adjacent each of the dividers 36 there will be two wide and narrow streams flowing into the body of liquid in the launder 32. By the time these streams have dropped to the liquid level, they will be quite irregular in contour and will carry a great deal of air down into the body of the liquid. Although the largest bubbles will probably rise out of the liquid, the smaller and more desirable bubbles will be carried down in the liquid through the intake openings 31. As the liquid passes through the impeller 27, the bubbles will be thoroughly broken up into extremely fine bubbles, which for convenience may be called bubblets. The bubblets will be carried with the liquid through the nozzle 23 into the main body of the tank. After being broken up by the impeller 27, these bubblets will be so fine that they will have only slight tendency to rise within the liquid and hence for the most part will flow with the liquid. The bubblets are preferably so fine that 90% of them will not rise over five inches per second. This size is much smaller than the size liberated from diffusion plates which are large enough so that their disturbance of the surface causes much of the grease to return to the body of liquid.

The quantity of these bubblets and hence the amount of aeration can be somewhat controlled by adjustment of the flow control plates 39, which not only control the thickness of the streams but also control the liquid level in the launder 32. However, it may be more readily controlled by admitting air through tubes 44, the admission of air through the tubes being controlled by valves 45. As explained in my copending application Serial No. 265,646, these tubes have outlets close to the impeller 27 so as to be subjected to a high degree of suction by the impeller so that air will be drawn in by simply opening the upper ends of the tubes to the atmosphere. Large quantities of air can be drawn in in this way, as a matter of fact, the injector plate 33 could be dispensed with if preferred.

The flow dividers 36 not only provide twice as many streams for a given number of openings through the injector plate 33 but they also tend to prevent the clogging of the openings. This is because of the fact that since the flow dividers extend a substantial distance, say two and a half inches, above the injector plate 33, foreign objects carried by the sewage are not likely to stretch across the passages 37 on both sides of the divider 36 and hence will usually be drawn into one divider or the other. In this connection it will be noted that the flanges 46 tend to decrease the speed of flow of the liquid through the passages 37 so that these passages may be wider for any given volume of flow and hence are less likely to be clogged. In the event that they should become clogged, however, the liquid can flow over a ring 47 which is adjustably carried by the plate 33, so that it may be positioned at any desired height above the normal liquid level.

Grease flotation

Although these bubblets will be so tiny that their drift or tendency to rise will be very slight, they will be extremely numerous and their slight drift through the liquid will cause them collectively to come into contact with a very high percentage of the molecules of the liquid. In some manner these bubblets gather to them not only the free grease within the liquid but also a large proportion of the combined grease. Gradually they accumulate on the surface of the liquid so that they remove a very large proportion of the total grease content of the liquid. In order to keep the bubblets which have accumulated on the surface in the form of a foam from being drawn back into the liquid by the pump, a skimming ring 49 is provided above the periphery of the injector plate 33, being supported by the brackets 38. A sufficient flow space 50 is left between the ring 49 and the injector plate 33 so that there will be practically no head loss between the main body of the liquid in the tank and the body of liquid above the injector plate 33.

Skimming

The grease-carrying foam could be skimmed from the top of the liquid by periodically causing the liquid to overflow by lowering the shear gate 18. This would cause an undesirable quantity of liquid to be withdrawn with the foam, however, and it is preferred to skim the foam off mechanically. As a matter of fact, it has been found that the flotation of the grease is accomplished much more rapidly if the depth of foam is kept quite low by a continuous skimming. For this reason some such mechanical skimming as is shown diagrammatically in the lower left-hand corner of Fig. 1 and in diagrammatic cross section in Fig. 3, is preferably provided. This mechanical skimmer has been shown in only one position but it should be understood that one or more such skimmers would be provided for each tank. As a matter of fact, in tanks specially designed for such skimmers they will probably be positioned along the full length of each long side of the tank so as to draw the foam reasonably well from all points of the surface of the liquid within the tank.

The mechanical skimmer includes a shaft 51 which may be driven by a suitable motor, arms 52, and a blade 53. The blade 53 is preferably slightly helical so that the load on the motor driving shaft 51 will be fairly uniform, the pitch of the helix being insufficient to cause the foam to flow along the helix. The blade 53 preferably includes a rubber squeegee 54 which not only draws the foam from a point substantially spaced from the wall to the wall but also wipes it up along the wall and pushes it over the lip 55 of the wall into a trough 56 from which it is drained or flushed to the digester, as through a pipe 57 of Fig. 1.

It will be apparent, of course, that any desired constructional features of support may be used. For example, the nozzle 23 and downflow tube 22, launder 32 and associated parts may rest on the tank floor and may be rigidly held by suitable guys 59.

Grit scouring and removal

In some portions of the tank the fluid will be relatively quiescent and there will be a tendency for grit to settle toward the floor of the tank. Although the rate of flow of the liquid along the floor will be fast enough to sweep the grit along with it, it will nevertheless thoroughly scour the grit and remove the organic matter from it. Heretofore special equipment has been provided for removing the grit so as to keep it out of the other apparatus where it tends to settle in corners and become septic. The corners all along the bottom of each tank 12, except as will be noted, are provided with fillets 61 of relatively great radius of curvature so that there will be no tendency of the grit to settle in these corners. At one or more corners of each tank, however, the fillets may be omitted so that the grit, and especially the larger grit, will tend to settle in these corners. The settled grit may occasionally be pumped from such a corner through a pipe 62. Instead of providing a grit catching pocket and pumping the grit therefrom, it will often be sufficient to merely let the grit accumulate in the lower portion of the tank and occasionally stop the operation of the tank to allow the grit to settle and then remove it by hand.

Flocculation

Although the movement of the bubblets with respect to the liquid in which they are suspended is relatively slight, it is enough to cause some flocculation of solids suspended within the liquid. Furthermore, the drift of the bubblets is so gradual that it will never break up the flocs once they have formed. This flocculation is very desirable because of bringing the suspended solid matter together into flocs that are large enough so that those heavier than water settle out when the sewage is passed through the settling tank. The grease separation is also rendered more efficient by this flocculation. The bubblets tend to keep the flocs relatively high in the liquid, well above the strata in which most of the grit is found, although of course below the surface of the liquid where the grease bearing foam is found. The outlet pipe 16 is positioned at a suitable height for drawing off the sewage having a relatively high proportion of flocs therein, the pipe 16 carrying this sewage, as previously noted, to the settling tank.

Although it will be noted from Fig. 1 that the tanks 12 chosen for illustration are about twice as long as they are wide and are designed for two recirculating units in each tank, it will of course be understood that the tanks could be square or round and have only one recirculating unit therein.

Although dimensions will be subject to variation to suit varying conditions, it may be noted that the flow dividers 36 have been found to be satisfactory when four inches with two and a half inches extending above the plate and with a thickness at their base of 15/16 of an inch. The length of the dividers and hence of the openings 34 is unimportant, except that, if they are made shorter, more openings will be required for a given volume with a given thickness of stream. The illustrated injector plate has been found to be satisfactory with openings 14 inches long. The other parts of the apparatus may be taken as shown in proportion. In many respects, such as tank size, for example, there may be wide variations, the only important consideration as to the depth of the tank from the standpoint of grease flotation being that the tank be of sufficient depth or so baffled that the current of liquor from the downflow tube 22 will not ripple the surface. To remove the grit it must of course also be sufficiently deep so that the liquor can be drawn off above the strata where the grit is mainly found. Since the efficiency of flotation greatly decreases when the foam gets to a depth somewhere around two inches, the speed, location and effectiveness of the skimmers should be such as to prevent the foam from reaching a depth of two inches at any point. In this connection it may be noted that the liquid level may be maintained closer to the top of the wall if desired, although the skimming arrangement shown tends to result in draining free liquid from the foam before it is pushed into the trough 56 by the skimmer.

From the foregoing it is seen that a sewage treatment unit is provided which simultaneously aerates and flocculates the sewage, removes grease therefrom, and cleans and removes grit therefrom, thus performing in one unit steps which heretofore have been performed by a variety of units and some of which have not been very satisfactorily performed at best.

I claim:

1. Apparatus for removing grease from sewage or analogous liquor, including a tank for the liquor having means for supplying liquor thereto and removing it therefrom, a downflow tube within the tank, an impeller associated with the tube to cause the liquor to flow downwardly therethrough, means for driving the impeller, and an intake structure for the impeller and tube having its inlet positioned below the top surface of the liquor within the tank and constructed to draw liquor from below said surface, means for restraining surface water in the tank from being drawn to the impeller, said intake structure including a partition below the inlet having a plurality of elongated holes therethrough and V-shaped dividers projecting upwardly from the holes and spaced from opposite sides thereof to permit two streams of water to flow through each hole in the partition to cause gas bubbles to be mixed with the liquor as it flows to the impeller and means for withdrawing floated grease separately from the liquor.

2. Apparatus for breaking up a body of liquor including lengthy solid particles into a plurality of individual streams and aerating the streams, including a plate having elongated apertures therein and positioned to be within a body of liquor, means for drawing liquor from said body through said aperture and a flow divider extending longitudinally along the central portion of the aperture, of sufficient width to cause two separate streams to flow through the aperture and extending at least approximately two inches above the aperture whereby the tendency of elongated solid particles to be drawn simultaneously into two streams is minimized and means admitting air below said plate to surround said streams.

3. Apparatus for treating sewage or analogous liquor, including an open tank having means for supplying liquor thereto and removing it therefrom, means for causing finely divided gas bubbles to be mixed with the contents of the tank throughout the tank while maintaining at least part of the contents of the tank adjacent the surface in a sufficiently quiescent state to permit the finely divided bubbles to rise gently to the surface and while leaving the surface where said bubbles arise otherwise substantially unbroken, means for skimming the resultant foam from the surface, and means for flowing a swift current of the liquor along the floor of the tank outwardly from an inner point thereof to wash from grit which tends to settle to the floor solid matter lighter than the grit, said tank having fillets between the floor and side walls thereof to prevent the complete settling of grit where said fillets are provided but spaced to form a pocket to receive said grit, and means for removing grit from the pocket.

4. Apparatus for breaking up a body of liquor including lengthy solid particles into a plurality of individual streams and aerating the streams, including a plate having elongated apertures therein and positioned to be within a body of liquor, means for drawing liquor from said body through said apertures, and a stationarily mounted flow divider extending longitudinally along the central portion of each of said apertures, of sufficient width to cause two separate streams to flow through each aperture and extending at least approximately two inches above the aperture whereby the tendency of elongated solid particles to be drawn simultaneously into two streams is minimized and means admitting air below said plate to surround said streams.

5. Apparatus for treating sewage and the like including a tank adapted to maintain a body of liquor therein, a launder, a substantially horizontal plate above the launder and below the surface of said body of liquor having a plurality of openings therethrough, means for restraining surface waters of said body from flowing over said plate and providing passages between the body and the openings in said plate whereby said plate will be flooded with liquor from said body below the surface thereof, means for drawing liquor from the launder while maintaining a body of liquor in the launder having a surface spaced below said plate whereby streams of liquor will flow through said openings and through said last named surface to entrap gas in the liquor in said launder, and a conduit for admitting a gas into said launder above the liquor therein; said openings being long and narrow in shape to produce wide thin streams.

6. Apparatus for treating sewage and the like including a tank adapted to maintain a body of liquor therein, a launder, a substantially horizontal plate above the launder and below the surface of said body of liquor having a plurality of openings therethrough, means for restraining surface waters of said body from flowing over said plate and providing passages between the body and the openings in said plate whereby said plate will be flooded with liquor from said body below the surface thereof, a pump for drawing liquor from the launder while maintaining a body of liquor in the launder having a surface spaced below said plate whereby streams of liquor will flow through said openings and through said last named surface to entrap gas in the liquor in said launder, and a conduit for admitting a gas into said launder above the liquor therein; said openings being long and narrow in shape to produce wide thin streams, a conduit through which said pump discharges into the body of liquor in the tank in the lower portion thereof, the discharge opening of the conduit being so directed as to cause a swirling of the liquor substantially throughout the lower portion of the tank while leaving the surface thereof substantially undisturbed.

7. The method of removing grease and grit from a liquor containing additional solid matter lighter than the grit, including the steps of flowing the liquor into a tank to form a body of liquor, withdrawing some of the liquor from below the surface of the body while restraining the surface liquor from being withdrawn mixing finely divided bubbles of a gas with the withdrawn liquor, flowing a stream of the liquor with the gas bubbles therein rapidly along the floor of the tank to wash the additional solid matter from the grit which tends to fall to the floor, and to agitate the lower portion of the liquor in the tank to flocculate matter suspended therein permitting the bubbles to rise to the surface and form a foam thereon, drawing off the foam separately from the liquor and drawing off liquor and flocs dispersed therein from a position slightly below the surface and substantially above the floor.

8. The method of removing grease from waste liquor, which comprises flowing the liquor into a tank to form a body of liquor, maintaining a substantially quiescent surface on a part of the body, drawing a stream of liquor from the body beneath the surface while maintaining said surface substantially undisturbed and restraining the flow of surface liquor into said stream, entraining a multitude of fine bubbles in said stream, violently agitating the stream with the bubbles therein to break up the bubbles, directing the stream into the body with sufficient force to agitate the body throughout a flocculation zone substantially spaced below said surface and thereby flocculating matter suspended within the liquor, allowing said bubbles to rise to said surface, 90% of said bubbles being of a size which will not rise over approximately 5 inches per second and being too small to break the surface violently enough to materially retard the flotation of grease, removing grease from said surface and separately removing the greater quantities of the liquor from the tank from below said surface.

9. Apparatus for removing grease from sewage or analogous liquor, including a detention tank for the liquor having means for supplying liquor thereto, a downflow tube within the tank, an impeller associated with the tube to cause the liquor to flow downwardly therethrough, an intake structure for the impeller and tube having its inlets positioned below the surface of the liquor within the tank and constructed to draw liquor from said tank below said surface, means for restraining surface water in the tank from being drawn to the impeller, means for introducing gas into the liquor between the inlets and the impeller whereby the gas is finely divided and mixed with the liquor by the impeller, the tube having its outlet disposed to direct the stream bearing said bubbles into the lower part of the tank to agitate the lower portion of the liquor, produce flocculation therein and distribute the bubbles therethrough, means for withdrawing floated grease from the liquor, separate means for withdrawing heavy solids from the lower part of the tank, and separate means for withdrawing liquor and dispersed flocs therein from an intermediate level in the tank.

10. Apparatus for removing grease from sewage or analogous liquor, including a detention tank for the liquor having means for supplying liquor thereto, a downflow tube within the tank, an impeller associated with the tube to cause the liquor to flow downwardly therethrough, an intake structure for the impeller and tube having its inlets positioned below the surface of the liquor within the tank and constructed to draw liquor from said tank below said surface, means for restraining surface water in the tank from being drawn to the impeller, means for introducing gas into the liquor between the inlets and the impeller whereby the gas is finely divided and mixed with the liquor by the impeller, the tube having its outlet disposed to direct the stream therefrom bearing said bubbles into the lower part of the tank to agitate the lower portion of the liquor and distribute the bubbles therethrough, means for withdrawing floated grease from the liquor, and separate means for withdrawing liquor from an intermediate level in the tank.

JAMES D. WALKER.